(12) United States Patent
Nakazawa et al.

(10) Patent No.: US 8,937,117 B2
(45) Date of Patent: Jan. 20, 2015

(54) METHOD FOR PREPARING EMULSION RESIN COMPOSITION FOR CATIONIC ELECTRODEPOSITION PAINT

(71) Applicant: Nippon Paint Co., Ltd., Osaka (JP)

(72) Inventors: Noriyuki Nakazawa, Osaka (JP); Masahiko Harada, Osaka (JP); Yotaro Abe, Osaka (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 14/345,674

(22) PCT Filed: Feb. 27, 2013

(86) PCT No.: PCT/JP2013/055223
§ 371 (c)(1),
(2) Date: Mar. 19, 2014

(87) PCT Pub. No.: WO2013/129517
PCT Pub. Date: Sep. 6, 2013

(65) Prior Publication Data
US 2014/0235756 A1    Aug. 21, 2014

(30) Foreign Application Priority Data

Feb. 28, 2012  (JP) .................................. 2012-041893

(51) Int. Cl.
| | | |
|---|---|---|
| *C08L 63/00* | (2006.01) | |
| *C09D 163/00* | (2006.01) | |
| *C09D 5/02* | (2006.01) | |
| *C09D 175/04* | (2006.01) | |
| *C09D 5/44* | (2006.01) | |
| *C08G 59/40* | (2006.01) | |

(52) U.S. Cl.
CPC ............... *C08L 63/00* (2013.01); *C09D 175/04* (2013.01); *C09D 5/022* (2013.01); *C09D 5/4438* (2013.01)
USPC ........... 523/415; 523/402; 523/414; 524/800; 524/801; 524/839

(58) Field of Classification Search
USPC ..................... 516/53, 67; 523/402, 414, 415; 524/800, 801, 839
See application file for complete search history.

(56) References Cited

U.S. PATENT DOCUMENTS

| | | | | |
|---|---|---|---|---|
| 6,313,218 B1 * | 11/2001 | Fiori et al. | ..................... | 524/801 |
| 6,316,543 B1 * | 11/2001 | Fiori | ............................. | 524/801 |
| 2004/0214923 A1 * | 10/2004 | Hori et al. | ..................... | 523/336 |

FOREIGN PATENT DOCUMENTS

| | | |
|---|---|---|
| EP | 0 253 404 | 1/1988 |
| JP | 4-279679 | 10/1992 |
| JP | 9-132737 | 5/1997 |
| JP | 2004-307774 | 11/2004 |
| JP | 2007-313420 | 12/2007 |
| JP | 2008-018320 | 1/2008 |
| JP | 2008-080257 | 4/2008 |
| JP | 2009-138126 | 6/2009 |

OTHER PUBLICATIONS

International Search Report issued May 28, 2013 in International (PCT) Application No. PCT/JP2013/055223.
English translation of International Preliminary Report on Patentability issued Sep. 12, 2014 in International (PCT) Application No. PCT/JP2013/055223.

* cited by examiner

*Primary Examiner* — Michael J Feely
(74) *Attorney, Agent, or Firm* — Wenderoth, Lind & Ponack, L.L.P.

(57) ABSTRACT

The present invention is a method for preparing an emulsion resin composition for a cationic electrodeposition paint, which reduces or eliminates time for desolvation. The emulsion resin composition for cationic electrodeposition paint includes a cationic epoxy resin and a blocked isocyanate curing agent. The method features the steps of: (1) a step of mixing water and the cationic resin to form a W/O emulsion, (2) a step of mixing the blocked isocyanate curing agent and the W/O emulsion to form a curing agent-containing W/O emulsion, and (3) a step of mixing water and the curing agent-containing W/O emulsion to form an O/W emulsion, via a phase inversion point from W/O emulsion to O/W emulsion. The method features a solid concentration by mass $X_{w/o}$ (%) of the curing agent-containing W/O emulsion and a solid content by mass $X_{tra}$ (%) at the phase inversion point from W/O emulsion to O/W emulsion satisfying a relation of $X_{w/o} - X_{tra} > 3\%$.

7 Claims, 1 Drawing Sheet

METHOD FOR PREPARING EMULSION RESIN COMPOSITION FOR CATIONIC ELECTRODEPOSITION PAINT

TECHNICAL FIELD

The present invention is related to a novel method for preparing an emulsion resin composition for cationic electrodeposition paint.

BACKGROUND ART

Liquid paint composition is classified into the two types: organic solvent type paint composition and aqueous paint composition. Aqueous paint composition is generally explained to be lower environmental load in comparison with organic solvent type paint composition, because it contains organic solvent in a small amount. However, even in case of aqueous paint composition, organic solvent is employed in many cases in order to control viscosity when preparing film forming resin or curing agent resin or when preparing paint, or in order to make work of preparing paint easy. If the organic solvent employed when preparing aqueous paint composition is also emitted into environment, the organic solvent also burdens on environment and therefore is not preferred.

For example, in case of preparing a cationic electrodeposition paint composition which is one of aqueous paint composition, it has been essential that organic solvent for diluting is formulated thereto when preparing cationic epoxy resin emulsion. Organic solvent is added for reducing viscosity of resin component and for improving handleability both in mixing when preparing an emulsion and in transferring a varnish. As the organic solvent for diluting, methyl isobutyl ketone (hereinafter called "MIBK") and/or xylene are preferably used. This is because MIBK and xylene have compatibility with cationic epoxy resin and do not react with an epoxy group when preparing cationic epoxy resin. The presence of a large amount of MIBK and xylene for diluting in the electrodeposition paint composition severely affects paint stability and throwing power in electrocoating. Accordingly, the organic solvent is generally removed in a desolvation step which is one step of preparing emulsion resin. The removal of the solvent takes a time when preparing emulsion resin and the use of the solvent which is not necessary in a final paint increases preparation cost of electrodeposition paint composition.

For example, JP 2004-307774 A (Patent Literature 1) discloses a process for producing a cationic electrodeposition paint from a cationic paint resin composition which comprises a basic resin, a curing agent, an additive and an organic solvent, wherein (1) the additive is formulated in water dispersion and desolvation and (2) after a neutralization treatment, deionized water is added and pressure is reduced, whereby both of the water dispersion step and the desolvation step are carried out simultaneously (see claim 1). The process of Patent Literature 1, however, is not preferred in view of reduction of VOC (volatile organic compound), because a large amount of organic solvent is employed in the process of Patent Literature 1. Desolvation step is also necessary to remove the organic solvent and the process of Patent Literature 1 does not lead to reduction of production time of paint and to elimination of production equipment.

Another approach to reduce organic solvent and to enhance handleability by reducing viscosity of resin components includes, for example, a means in which mixing operation is conducted at an elevated temperature of 100° C. or more. It is general that a resin component reduces its viscosity, as temperature increases. However, an epoxy resin and a curing agent of the resin components generally have reactivity with each other over a certain temperature and start reaction. As the result of the reaction, a molecular weight of the resin components increases and a viscosity of the composition increases adversely, which deteriorates smoothness of the resulting coating film. Accordingly, the approach to increase temperature and to decrease viscosity does not apply directly a preparation of a heat-curable paint.

JP 2009-138126 A (Patent Literature 2) discloses a method for preparing a cationic electrodeposition paint composition which comprises: the first step of emulsifying an amine-modified epoxy resin (a), a thermosetting agent (b) and an acrylic monomer (c) to form a pre-emulsion, the second step of adding a polymerization initiator to the pre-emulsion and polymerizing the acrylic monomer (c) to obtain an acrylic resin-containing emulsion, and the third step of mixing the emulsion obtained at the second step with a pigment dispersion paste to prepare the cationic electrodeposition coating composition (see claim 1 and other portions of Patent Literature 2). Patent Literature 2 discloses in paragraphs [0024] to [0026] that the method can surely make possible leveling function derived from the acrylic resin component in the cationic electrodeposited coating and can effectively cut an amount of volatile organic compound (VOC) in preparing the cationic electrodeposition paint composition. In the invention of Patent Literature 2, the acrylic monomer is emulsified to form a pre-emulsion, but the present invention does not form pre-emulsion.

CITATION LIST

Patent Literature

[PTL 1] JP 2004-307774 A
[PTL 2] JP 2009-138126 A

SUMMARY OF INVENTION

Technical Problem

The present invention is to provide a method for preparing an emulsion resin composition for a cationic electrodeposition paint, which prepare a cationic electrodeposition paint composition with reducing time for desolvation or eliminating desolvation step.

Solution to Problem

Accordingly, the present invention provides a method for preparing an emulsion resin composition for cationic electrodeposition paint, which comprises a cationic resin and a blocked isocyanate curing agent, the method comprises the steps:

(1) a step of mixing water and the cationic resin to form a W/O emulsion, (2) a step of mixing the blocked isocyanate curing agent and the W/O emulsion to form a curing agent-containing W/O emulsion, (3) a step of mixing water and the curing agent-containing W/O emulsion to form an O/W emulsion, via a phase inversion point from W/O emulsion to O/W emulsion, wherein the cationic resin comprises a cationic epoxy resin, and a solid content by mass $X_{W/O}$ (%) of the curing agent-containing W/O emulsion and a solid content by mass $X_{tra}$ (%) at the phase inversion point from W/O emulsion to O/W emulsion satisfy a relation of $X_{W/O}-X_{tra}>3\%$.

In the above method, when the blocked isocyanate curing agent is composed of a block isocyanate curing agent (b1) having a dissociation temperature of not less than 230° C. and a block isocyanate curing agent (b2) having a dissociation temperature of less than 230° C., it is preferred that the step (1) consists of mixing water, the cationic resin and a portion or all of the block isocyanate curing agent (b1) to form a W/O emulsion, and the step (2) consists of mixing the obtained W/O emulsion, the block isocyanate curing agent (b2) and the balance of the block isocyanate curing agent (b1) if any to form a curing agent-containing W/O emulsion.

In the above method, it is also preferred that the cationic epoxy resin has a number average molecular weight of 800 to 5,000.

According to the present invention, it is preferred that the curing agent-containing W/O emulsion obtained in the step (2) contains methyl isobutyl ketone and xylene in an amount of not more than 8% by mass, preferably not more than 4% by mass, more preferably not more than 3% by mass, based on the total resin solid content of the cationic resin and the blocked isocyanate curing agent.

It is also preferred in the present invention that a solid content by mass $X_{W/O}$ (%) of the curing agent-containing W/O emulsion and a solid content by mass $X_{tra}$ (%) at the phase inversion point from W/O emulsion to O/W emulsion meets the following inequality:

$$X_{W/O}-X_{tra}>8\%.$$

Advantageous Effects of Invention

In the conventional method for preparing an emulsion containing a cationic resin for a cationic electrodeposition paint composition, a step of adding specific organic solvents (i.e. MIBK and xylene) to reduce viscosity and to enhance handleability is essential. In the present invention, on the other hand, it is characterized as one of ingenious methods that a W/O emulsion is prepared using a cationic resin and then a blocked isocyanate curing agent is mixed thereto, followed by phase-inversing it to O/W emulsion which is then formed into a cationic electrodeposition paint. In the present invention, it is possible to handle the cationic resin at an elevated temperatures of more than 100° C., because the blocked isocyanate curing agent is added and mixed after preparing a W/O emulsion. Accordingly, an addition of MIBK and xylene is not so necessary and an amount of them would be significantly reduced. Even if the amount of MIBK and xylene is very small, a stable emulsion can be obtained using such an elevated temperature, without damaging handleability. It may further be possible that, even if MIBK and xylene are not added at all and a desolvation step is not conducted, a stable emulsion can be prepared. According to the present invention, environmental load derived from organic solvent when preparing the cationic electrodeposition paint is significantly reduced. The method of the present invention is also effective in reduction of $CO_2$ emission.

In preparing the emulsion resin composition for cationic electrodeposition paint in the present invention, it is preferred that handling can be changed by a dissociation temperature of a blocked isocyanate curing agent. For example, if the dissociation temperature of the blocked isocyanate curing agent is 230° C. or more, the curing agent can be added in the step (1) of preparing W/O emulsion. However, if the dissociation temperature of the blocked isocyanate curing agent is less than 230° C., the curing agent is added in the step (2) of forming curing agent-containing W/O emulsion. This method inhibits unnecessary curing reaction and does not lower stability of emulsion and smoothness of coating film formed by the electrodeposition paint. The method of the present invention also achieves elimination of steps or reduction of preparing period, and reduces environmental load.

BRIEF DESCRIPTION OF DRAWINGS

FIG. 3 is a graph which shows changing rate of viscosity based on solid concentration by mass, when preparing an emulsion resin composition for a cationic electrodeposition paint.

DESCRIPTION OF EMBODIMENTS

The method of the present invention is related to a method for preparing an emulsion resin composition for a cationic electrodeposition paint composition, which comprises a cationic resin and a blocked isocyanate curing agent. The method comprises the following steps:

(1) a step of mixing water and the cationic resin to form a W/O emulsion,
(2) a step of mixing the blocked isocyanate curing agent and the W/O emulsion to form a curing agent-containing W/O emulsion,
(3) a step of mixing water and the curing agent-containing W/O emulsion to form an O/W emulsion, via a phase inversion point from W/O emulsion to O/W emulsion.

Each component employed in the above preparation method is explained hereinafter.

Cationic Resin

The cationic resin employed in the present invention comprises a cationic epoxy resin having a hydroxyl group. The cationic resin may also include a cationic acrylic resin having a hydroxyl group.

Cationic Epoxy Resin

The cationic epoxy resin can be any epoxy resin modified with amine, which is employed in an electrodeposition paint composition, including a cationic epoxy resin (for example, those described in JP Kokoku Publications Sho 54-4978 and Sho 56-34186) and a commercially available epoxy resin modified with amine.

For example, the cationic epoxy resin is an amine-modified epoxy resin which is obtained by modifying a resin having an oxirane group with an amino group-containing compound. The amine-modified epoxy resin is obtained by reacting an oxirane group of a reactant resin with an amino group-containing compound, such as primary amine, secondary amine, tertiary amine and/or a salt thereof to ring-open. Representative examples of the reactant resin include polyphenol polyglycidyl ether type epoxy resin, that is, a reaction product of polycyclic phenol compound (e.g. bisphenol A, bisphenol F, bisphenol S, phenol novolak, cresol novolak) with epichlorohydrin. Examples of the other reactant resins are xylene resin-modified epoxy resin, polypropylene glycol-modified epoxy resin, an epoxy resin having oxazolidone ring as described in JP H05-306327 A and the like. The epoxy resin can also be one which is obtained by reacting a diisocyanate compound or a bisurethane compound (obtained by blocking a NCO group of a diisocyanate compound with a lower alcohol, such as methanol, ethanol and the like) with epichlorohydrine.

The reactant resin can also be chain-extended by bifunctional polyester polyol, polyether polyol, bisphenol or dibasic carboxylic acid and the like, before ring-opening reaction of an oxirane ring by amino-group containing compound.

The reactant resin can further be modified in a portion of oxirane groups by a monohydroxy compound, such as 2-ethylhexanol, nonylphenol, ethyleneglycol mono-2-ethylhexyl ether, ethyleneglycol mono-n-butyl ether, propyleneglycol mono-2-ethylhexyl ether and the like, before ring-opening reaction of oxirane ring by amino-group containing compound. This modification is generally conducted for controlling molecular weight or amine equivalent and for improving heat flow ability. In addition, the modification can be conducted using a monobasic acid, such as butyric acid, valeric acid, caproic acid, enantoic acid, caprylic acid, octylic acid, pelargonic acid, capric acid, lauric acid, myristic acid, palmitic acid, stearic acid and the like.

The amino-group containing compound for ring-opening oxirane groups, which is used for introducing amino group, includes primary amine, secondary amine or tertiary amine and/or a salt thereof, such as butylamine, octylamine, diethylamine, dibutylamine, methylbutylamine, monoethanolamine, diethanolamine, N-methylethanolamine, N-ethylethanolamine, triethylamine, N,N-dimethylbenzylamine, N,N-dimethylethanolamine and the like. The amino-group containing compound can also be blocked with a ketimine and examples of the ketimine-blocked amino-group containing compounds are a ketimine-blocked primary amino-group containing secondary amine (e.g. aminoethylethanolamine methylisobutylketimine), diethylenetriamine diketimine and the like. The amino-group containing compound is needed to use an equivalent amount with oxirane group, in order to ring-open all oxirane groups.

The above cationic epoxy resin preferably has a number average molecular weight of 800 to 5,000. Number average molecular weights of less than 800 may deteriorate physical properties of solvent resistance and corrosion resistance in a cured and electrodeposited coating film obtained from the resulting electrodeposition paint. Those of more than 5,000 may deteriorate handleability in emulsifying dispersion of the resulting resin. High molecular weights may also reduce flowability when heat-curing, because of high viscosity, and deteriorate coating appearance. It is preferred that the cationic epoxy resin has a number average molecular weight of 1,000 to 3,000.

The number average molecular weight used herein is determined by gel permeation chromatography (GPC) and calculated in terms of polystyrene standard.

The cationic epoxy resin preferably has a hydroxyl value of 50 to 250 mg KOH/g in resin solid content. If hydroxyl values are less than 50 mg KOH/g in resin solid content, curability in the resulting cured coating film would be deteriorated. On the other hand, if hydroxyl values are more than 250 mg KOH/g, large number of hydroxyl groups would remain in the resulting cured coating film and deteriorate water resistance in the resulting coating film.

The cationic epoxy resin preferably has an amine value of 40 to 150 mg KOH/g in resin solid content. If amine values are less than 40 mg KOH/g in resin solid content, preparation of emulsion or dispersion in aqueous medium after acidifying would be poor. If amine values are more than 150 mg KOH/g, large number of amino groups would remain in the resulting cured coating film and deteriorate water resistance in the resulting coating film.

Cationic Acrylic Resin

The cationic resin of the present invention may contain a cationic acrylic resin if necessary. The cationic acrylic resin can be prepared by radically copolymerizing a hydroxyl group-containing monomer, a glycidyl group-containing monomer and another copolymerizable monomer to obtain a copolymer, which is then reacted with an amino group-containing compound.

The cationic acrylic resin preferably has a number average molecular weight of 1,500 to 7,000. Number average molecular weights of less than 1,500 may deteriorate physical properties, such as solvent resistance and the like, in the resulting cured and electrodeposited coating film. Those of more than 7,000 may reduce flowability when heating and curing, and may deteriorate appearance of the cured coating film.

Blocked Isocyanate Curing Agent

The blocked isocyanate curing agent is a component which reacts with hydroxyl group of the cationic resin to cure, when heating and curing the electrodeposited coating film of the cationic electrodeposition paint composition. The blocked isocyanate curing agent is not limited thereto, but includes a polyisocyanate compound blocked with a blocking agent.

The term "polyisocyanate" is a compound having at least two isocyanate groups in one molecule. Polyisocyanate includes aliphatic, alicyclic, aromatic or aromatic-aliphatic polyisocyanate.

Examples of the polyisocyanate compounds are:

an aromatic diisocyanate or aromatic polyisocyanate, such as tolylene diisocyanate (TDI), diphenylmethane diisocyanate (MDI), p-phenylene diisocyanate, polymethylene polyphenyl polyisocyanate, naphthalene diisocyanate and the like;

an aliphatic diisocyanate having 3 to 12 carbon atoms, such as hexamethylene diisocyanate (HDI), 2,2,4-trimethylhexanemethylene diisocyanate, lysine diisocyanate and the like;

an alicyclic diisocyanate having 5 to 18 carbon atoms, such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidene dicyclohexyl-4,4'-diisocyanate and 1,3-diisocyanato methylcyclohexane (hydrogenated XDI), hydrogenated TDI, 2,5- or 2,6-bis(isocyanatomethyl)-bicyclo[2,2,1]heptane (also called norbornane diisocyanate) and the like;

an aliphatic diisocyanate having aromatic ring, such as xylylene diisocyanate (XDI), tetramethylxylylene diisocyanate (TMXDI) and the like;

a modified compound thereof (urethanized compound, carbodiimide compound, urethodione compound, urethonimine compound, biuret and/or isocyanurate modified compound); and the like.

The polyisocyanate compound can be used solely or in combination thereof. Especially, a mixture of diphenylmethane diisocyanate (MDI) and polymethylene polyphenyl polyisocyanate is called as crude MDI. The crude MDI is commercially available as Sumidur 44V10, Sumidur 44V20, Sumidur 44V40 (Sumitomo Bayer Urethane Co., Ltd.); MR-200, MR-2005, MR-400 (Nippon Polyurethane Industry Co., Ltd.); and the like.

An adduct or a prepolymer which is obtained by reacting polyisocyanate with a polyhydric alcohol (e.g. ethylene glycol, propylene glycol, trimethylolpropane, hexane triol etc.) in a NCO/OH ratio of 2 or more can also be used as the blocked isocyanate curing agent.

The blocked isocyanate curing agent is prepared by blocking the above mentioned polyisocyanate with a blocking agent. The blocking agent is a compound which is addition-reacted to an isocyanate group, to form an adduct which is stable at ambient temperature and which is dissociated to reproduce the isocyanate group when heating to a temperature of more than a dissociation temperature.

The blocking agent employed for preparing the blocked isocyanate curing agent include, for example, a lactam type blocking agent, such as ε-caprolactam, δ-valerolactam, γ-butyrolactam and β-propiolactam; an ethyleneglycol monoalkyl ether type blocking agent, such as ethyleneglycol monomethyl ether, ethyleneglycol monoethyl ether, ethyleneglycol monobutyl ether, ethyleneglycol mono-2-ethylhexyl ether and the like; a propyleneglycol monoalkyl ether type blocking agent, such as propyleneglycol monomethyl ether, propyleneglycol monoethyl ether and the like; a diethyleneglycol monoalkyl ether type blocking agent, such as diethyleneglycol monomethyl ether, diethyleneglycol monoethyl ether and the like; a phenol type blocking agent, such as phenol, cresol, xylenol, chlorophenol, ethylphenol and the like; an active methylene type blocking agent, such as ethyl acetoacetate ethyl, acetylacetone and the like; an alcohol type blocking agent, such as methanol, ethanol, propanol, butanol, amyl alcohol, benzyl alcohol, methyl glycolate, butyl glycolate, diacetone alcohol, methyl lactate, ethyl lactate, 2-ethylhexanol and the like; a glycol type blocking agent, such as ethylene glycol, propylene glycol and the like; an oxime type blocking agent, such as formaldoxime, acetaldoxime, acetoxime, methyl ethyl ketoxime, diacetyl monoxime, cyclohexanoxime and the like; a mercaptan type blocking agent, such as butyl mercaptan, hexyl mercaptan, t-butyl mercaptan, thiophenol, methylthiophenol, ethylthiophenol and the like; an acid amide type blocking agent, such as acetamide, benzamide and the like; an imide type blocking agent, such as succinimide, maleimide and the like; an imidazole type blocking agent, such as imidazole, 2-ethylimidazole and the like; a pyrazole type blocking agent; a triazole type blocking agent; and the like.

The blocking agent employed for preparing the blocked isocyanate curing agent is generally used in an equivalent amount with an isocyanate group of the polyisocyanate compound.

In the present invention, the blocked isocyanate curing agent having a dissociation temperature of less than 230° C. includes an aromatic, aliphatic, or alicyclic polyisocyanate compound blocked with one or more compounds selected from the group consisting of oxime type blocking agent and pyrazole type blocking agent; an aromatic polyisocyanate compound blocked with one or more compounds selected from the group consisting of lactam type blocking agent, propyleneglycol type blocking agent, and phenol type blocking agent; and the like.

The blocked isocyanate curing agent having a dissociation temperature of not less than 230° C. includes an aromatic, aliphatic, or alicyclic polyisocyanate compound blocked with one or more blocking agents selected from the group consisting of ethyleneglycol monoalkyl ether type blocking agent, propyleneglycol monoalkyl ether type blocking agent, diethyleneglycol monoalkyl ether blocking agent; an aliphatic or alicyclic polyisocyanate compound blocked with one or more blocking agents selected from the group consisting of lactam type blocking agent, propyleneglycol type blocking agent, and phenol type blocking agent; and the like.

The blocked isocyanate curing agent mentioned above has a suitable curing temperature (concretely 100 to 180° C.) for the preparation method of the present invention and therefore is preferably employed in the present invention.

The dissociation temperature of the blocked isocyanate curing agent of the present invention can be determined by a thermo gravimetric analyzer. Concretely, the dissociation temperature is obtained by weighing an initial mass of a blocked isocyanate curing agent and then determining a mass loss at around dissociation temperature at which the blocking agent is dissociated. For example, the dissociation temperature can generally be determined as intersection point at which a line of initial mass is crossed with a line of a mass decreasing linearly. The thermo gravimetric analyzer includes TG/DTA220 available from Seiko Instruments Incorporated.

The dissociation temperature obtained above is generally higher than one actually occurring in curing process, because the determination is conducted in an absence of both a catalyst and a cationic epoxy resin substituting for blocking agent. The temperature can, however, be an inherent dissociation temperature.

A dissociation temperature of the blocked isocyanate curing agent is important to the present invention. In case where the blocked isocyanate curing agent has a dissociation temperature of not less than 230° C., the blocked isocyanate curing agent can be formulated in either the preparation step (1) of W/O emulsion or the preparation step (2) of curing agent-containing W/O emulsion, or the both. In case where the blocked isocyanate curing agent has a dissociation temperature of less than 230° C., it is desired that the curing agent is formulated in the preparation step (2) of curing agent-containing W/O emulsion. This is because the addition of the blocked isocyanate curing agent with a dissociation temperature of less than 230° C. in the step (1) would start unnecessary curing reaction of the cationic epoxy resin and would increase viscosity of the paint to deteriorate appearance of the resulting deposited coating film.

In the present invention, it is preferred that the curing agent-containing W/O emulsion obtained in the step (2) contains a total of methyl isobutyl ketone (MIBK) and xylene, in an amount of not more than 8% by mass, preferably not more than 4% by mass, more preferably not more than 3% by mass, based on the total resin solid content of the cationic resin and the blocked isocyanate curing agent. The small content of MIBK and xylene, as mentioned above, reduces an amount of VOC (volatile organic compound) and lowers environment load. It also reduces a time of a desolvation step in the preparation of the cationic emulsion resin composition for cationic electrodeposition paint. Particular, if the content of MIBK and xylene is not more than 3% by mass, desolvation step by itself may be eliminated.

Preparation of Emulsion Resin Composition for Cationic Electrodeposition Paint

In the present invention, the method for preparing an emulsion resin composition for cationic electrodeposition paint, comprising a cationic resin and a blocked isocyanate curing agent, comprises the steps:

(1) a step of mixing water and the cationic resin to form a W/O emulsion, (2) a step of mixing the blocked isocyanate curing agent and the W/O emulsion to form a curing agent-containing W/O emulsion, (3) a step of mixing water and the curing agent-containing W/O emulsion to form an O/W emulsion, via a phase inversion point from W/O emulsion to O/W emulsion.

Figure 1:
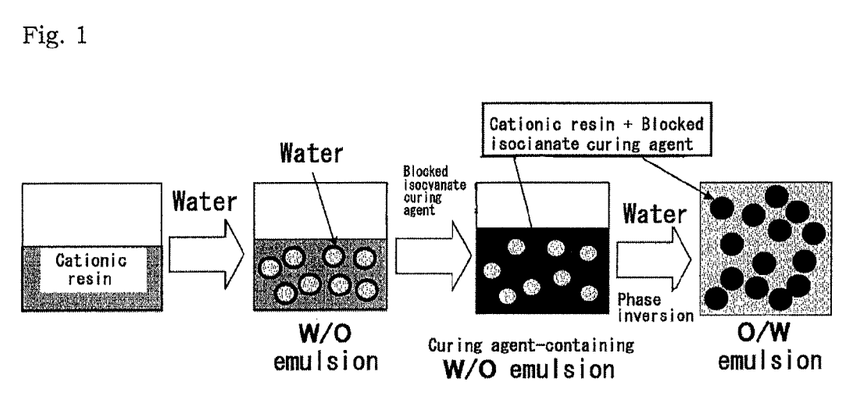
FIG. 1 is an explanation drawing which briefly indicates the preparation method of the present invention.

FIG. 1 shows a generally explaining drawing of the preparation method of emulsion resin composition for cationic electrodeposition paint. As explained in FIG. 1, cationic resin is mixed with water to form W/O emulsion in which water is dispersed as dispersoid in dispersing medium being oil (cationic resin). Thereafter, blocked isocyanate curing agent is mixed therein. Blocked isocyanate curing agent is hydrophobic compound and is compatibilized with the cationic resin of oil phase. Then, water is added thereto to phase-inverse the emulsion to O/W emulsion.

Preparation Step (1) of W/O Emulsion

Firstly, the cationic resin mentioned above is mixed with water to form a W/O emulsion. Before the mixing, it is preferred that the cationic resin is heated to 100 to 180° C. to reduce viscosity. The viscosity of the cationic resin can preferably be lowered to 10,000 mPa·s or less, preferably 6,000 mPa·s or less. Reduction of viscosity of cationic resin by heating in an absence of blocked isocyanate curing agent keeps handleability easy and reduces a difference of viscosity with water, and it is easily mixed or dispersed, thus preparing stable W/O emulsion.

In the step (1), in case where the blocked isocyanate curing agent contains both a blocked isocyanate curing agent (b1) with a dissociation temperature of not less than 230° C. and a blocked isocyanate curing agent (b2) with a dissociation temperature of less than 230° C., it is preferred that a portion or all of the blocked isocyanate curing agent (b1) with a dissociation temperature of not less than 230° C. is added and mixed to reduce viscosity. Since blocked isocyanate curing agent generally has lower viscosity than cationic resin, mixing the curing agent with the cationic resin reduces viscosity and does not necessitate viscosity reduction by heating. The blocked isocyanate curing agent (b) has such high dissociation temperature that unnecessary curing reaction does not occur as the heating temperature in the step (1) is 100 to 180° C. If the blocked isocyanate curing agent (b2) with a dissociation temperature of less than 230° C. is employed, it is preferred that, since the curing agent (b2) would start curing reaction in the step (1), the curing agent (b2) is not mixed in the step (1).

Water to be mixed includes pure water, distilled water, ion-exchanged water, deionized water or the like. An amount of water in the step (1) is preferably within the range of 10 to 100 parts by mass, based on the 100 parts by mass of the cationic resin.

In the step (1), a suitable amount of acid is generally added for effectively dispersing water in the cationic resin. Acid to be added includes, for example, an inorganic acid, such as chloric acid, nitric acid, hypophosphoric acid and the like; an organic acid, such as formic acid, acetic acid (including acetic anhydride or glacial acetic acid), lactic acid, sulphamic acid, aceturic acid and the like. An amount of acid to be added may preferably be within the range of 10 to 50 of a milligram equivalent of acid, more preferably 15 to 45, based on 100 g of a solid content of the cationic resin.

A W/O emulsion in which water is dispersed in the cationic resin is obtained according to the step (1). In the step (1), the dispersoid is water which has higher specific heat and is dispersed in the resin component being oil phase as disperse medium. A temperature of the resulting W/O emulsion can be reduced to less than 80° C. It is therefore that a temperature of the W/O emulsion can also be reduced, before adding the blocked isocyanate curing agent (b2) with a lower dissociation temperature. Accordingly, in the next step (2), the reaction between the cationic resin and the blocked isocyanate curing agent is inhibited when the blocked isocyanate curing agent (b2) is added and mixed.

Preparation Step (2) of Curing Agent-Containing W/O Emulsion

Next, the W/O emulsion obtained in the step (1) is mixed with the blocked isocyanate curing agent. In case where the blocked isocyanate curing agent contains both the blocked isocyanate curing agent (b1) and the blocked isocyanate curing agent (b2), the blocked isocyanate curing agent (b 1) remaining in the step (1) and whole of the blocked isocyanate curing agent (b2) are added in the step (2). In the step (2), a temperature of all solution is kept at a temperature of less than 80° C. and unnecessary reaction between the cationic resin and the blocked isocyanate curing agent is effectively inhibited. Accordingly, a limitation of dissociation temperature of the blocked isocyanate curing agent is not necessary.

In the step (2), the blocked isocyanate curing agent is hydrophobic and is compatible with the cationic resin of oil phase as disperse medium. According to the step (2), an amount of organic solvent is very small and a temperature is not elevated to a temperature at which the cationic resin and the curing agent are reacted to cure, thus forming a stable curing agent-containing W/O emulsion. It should be noted that a total amount of MIBK and xylene is same with a total amount of MIBK and xylene contained in the cationic resin and the blocked isocyanate curing agent.

A mixing ratio of the cationic resin and the blocked isocyanate curing agent is within the range of 90/10 to 40/60, preferably 85 to 15 to 45/55, more preferably 80/20 to 50/50 in an amount ratio of cationic resin/blocked isocyanate curing agent based on solid content by mass. If an amount of blocked isocyanate curing agent is larger than the above range, stability of the resulting O/W emulsion obtained in the following step (3) would be deteriorated because of high hydrophobicity of the blocked isocyanate curing agent. If it is smaller than the above range, the resulting electrodeposition paint may have poor curing ability.

Preparation Step (3) of O/W Emulsion

In the step (3), the curing agent-containing W/O emulsion obtained in the step (2) is mixed with water to increase water content in the curing agent-containing W/O emulsion. Increasing water content of the W/O emulsion would lead to a phase inversion to obtain an O/W emulsion.

In the present specification, a point of phase inversing from the curing agent-containing W/O emulsion to the O/W emulsion is called as "phase inversion point". The phase inversion point is a point at which disperse medium (that is, continuous phase) is changed from the resin component of oil phase to water of water phase. At the phase inversion point of the present invention, ion-exchanged water of 25° C. is added dropwise to the curing agent-containing W/O emulsion of 25° C. and is spread over the W/O emulsion, thus getting cloudy and slowly dissolving in the emulsion. The phase inversion point can be quantitatively obtained by measuring viscosity of emulsion. When the curing agent-containing W/O emulsion is mixed with water, a viscosity is continuously measured every 0.5 to 1.0% by solid concentration by mass of the emulsion. When a change rate of viscosity is less than 300 mPa·s/% based on solid concentration by mass, the point is determined as phase inversion point. The viscosity can be determined by B type viscometer at 25° C. using a rotor number 1 to 5 at 10 rpm.

In the preparation method of the present invention, when a solid concentration by mass of the curing agent-containing W/O emulsion obtained in the step (2) is defined as $X_{W/O}$ (%) and a solid concentration by mass at the phase inversion point from the curing agent-containing W/O emulsion to the O/W emulsion is defined as $X_{tra}$ (%), the $X_{W/O}$ (%) and $X_{tra}$ (%) satisfies a relation of $X_{W/O}-X_{tra}>3\%$.

If the $X_{W/O}$ (%) and $X_{tra}$ (%) satisfies the above mentioned relation, the O/W emulsion would have storage stability and would have a particle size suitable for preparing cationic electrodeposition paint composition. It is preferred that the $X_{W/O}$ (%) and $X_{tra}$ (%) satisfies a relation of $X_{W/O}-X_{tra}>8\%$. An upper limit of $X_{W/O}-X_{tra}$ can preferably be 50% in view of viscosity and more preferably be 40%.

The phase inversion point is almost governed by raw materials employed in the present invention and would be same with one that is obtained by mixing the cationic resin and the blocked isocyanate curing agent in resin condition and emulsifying it, as is conducted by a conventional method. Accordingly, as $X_{tra}$ is preliminary predicted, $X_{W/O}$ should be controlled to satisfy $X_{W/O}-X_{tra}>3\%$.

Concretely, a solid concentration by mass of W/O emulsion is calculated from an amount of blocked isocyanate curing agent to be added, such that the relation of $X_{W/O}-X_{tra}$ satisfies the above range. Then an amount of water is calculated from the obtained solid concentration by mass of W/O emulsion.

It is also preferred that $X_{W/O}$ is within the range of 35 to 85%. If $X_{W/O}$ is larger than 85%, an amount of water would be too small and a temperature is not so decreased, so that a reaction between cationic resin and blocked isocyanate curing agent may be initiated. If $X_{W/O}$ is less than 35%, an amount of water would be too much and continuous phase of oil phase would not be formed sufficiently, so that compatibility between cationic resin and blocked isocyanate curing agent would be deteriorated. This also makes particle size of emulsion particle larger and decreases storage stability of emulsion resin. It is more preferred that $X_{W/O}$ is within the range of 35 to 80%.

If the cationic resin is in O/W emulsion when the blocked isocyanate curing agent is added to the emulsion, the blocked isocyanate curing agent is immediately precipitated and an emulsion is not obtained.

In the above preparation method, an emulsion resin composition for cationic electrodeposition paint is obtained in the form of O/W emulsion. The O/W emulsion preferably has an average particle size of not more than 100 nm, more preferably not more than 90 nm. Particle sizes of more than 100 nm may deteriorate storage stability of the emulsion. In the present specification, the term "average particle size" of the emulsion is a median particle size in terms of volume. The determination of the "average particle size" can be conducted by a dynamic light scattering method using a Microtrac UPA-150 (a particle size analyzer) available from Nikkiso Co., Ltd. with a determination and a calculation employing a refractive index of solvent (water) of 1.33 and a refractive index of resin composition of 1.59.

The emulsion resin composition thus obtained above is preferably used for preparation of cationic electrodeposition paint. In the preparation method of the present invention, an additional process for desolvation may be conducted for removing MIBK and xylene which are present in the emulsion resin composition, after obtaining the O/W emulsion in the step (3). However, it is important that the desolvation step may not be necessary or may be time-reduced, in view of time reduction requirement of whole process and reduction of environmental load. In order to do so, it is essentially necessary that a total content of MIBK and xylene in the curing agent-containing W/O emulsion, based on the total resin solid content of the cationic resin and the blocked isocyanate curing agent containing in the curing agent-containing W/O emulsion obtained in the step (2), is controlled.

Preparation of Cationic Electrodeposition Paint Composition

A cationic electrodeposition paint composition is suitably prepared employing the emulsion resin composition for cationic electrodeposition paint which is obtained by the above mentioned preparation method of the present invention. The cationic electrodeposition paint composition is an aqueous paint composition which comprises a cationic resin, a blocked isocyanate curing agent as well as if necessary a pigment and an additive. The emulsion resin composition for cationic electrodeposition paint, obtained in the above preparation method of the present invention, is generally used as binder resin for preparing a cationic electrodeposition paint composition.

Pigment

The pigment used for cationic electrodeposition paint composition of the present invention can be any one that has been used for paint. Examples of the pigments to be employed are color pigment, such as titanium white, carbon black and red iron oxide; filler pigment, such as kaolin, talc, aluminum silicate, calcium carbonate, mica and clay; corrosion resistant pigment, such as iron phosphate, aluminum phosphate, calcium phosphate, aluminum tripolyphosphate, aluminum phosphomolybdate and aluminum zinc phosphomolybdate; and the like.

It is preferred that the pigment is preliminary mixed with a pigment dispersing resin in an aqueous medium in a high concentration to form a paste which is then mixed in a cationic electrodeposition paint composition. This is because the pigment is generally in the form of powder and is difficult to uniformly disperse in electrodeposition paint composition in a very low content. The paste is, generally called "pigment dispersing paste".

The pigment dispersing paste is prepared by dispersing pigment in pigment dispersing resin together with aqueous medium. The pigment dispersing resin can be a cationic or nonionic low molecular weight surfactant, or a cationic polymer (e.g. a modified epoxy resin having a primary amino group, a secondary amino group, a tertiary amino group, a quaternary ammonium group and/or tertiary sulfonium group). The aqueous medium includes ion exchanged water, water containing small amount of alcohol; or the like.

The pigment dispersing paste generally contains 5 to 40 parts by mass of a pigment dispersing resin based on 100 parts by mass of a pigment. The pigment dispersing paste can generally be prepared by mixing a pigment dispersing resin and a pigment and then dispersing them using a dispersing apparatus, such as a ball mill, a sand grind mill or the like, to result in that the pigment in the mixture has a desired and uniform particle size.

The pigment may preferably be contained in an amount of 1 to 50 parts by mass, based on 100 parts by mass of resin solid content in the cationic electrodeposition paint composition. Amounts of less than one part by mass would deteriorate barrier properties of oxygen, water or ion in the resulting cured electrodeposited coating film, and would lower corrosion resistance. Those of more than 50 parts by mass contain large amount of pigment and would reduce flowability when heat to cure, thus resulting in poor appearance of coating film.

Other Components

The cationic electrodeposition paint composition may contain a catalyst for dissociating the blocking agent in the blocked isocyanate curing agent, in addition to the above mentioned components. The catalyst includes a tin catalyst, such as dibutyltin dilaurate, dibutyltin oxide or dioctyltin oxide; an amine, such as N-methylmorphorine; a metal salt, such as a metal salt of strontium, cobalt, copper, bismuth; or the like. The catalyst may preferably be contained in an amount of 0.1 to 6 parts by mass, based on 100 parts by mass of a total amount of the cationic resin and the blocked isocyanate curing agent in the cationic electrodeposition paint composition. The cationic electrodeposition paint composition may also contain an additive which is art-known in paint field, such as plasticizer, surfactant, surface smoothing agent, antioxidant, ultraviolet absorber or the like.

The cationic electrodeposition paint composition can be prepared by mixing an emulsion resin composition for electrodeposition paint as obtained above, a pigment dispersing paste, an additive and the like. In the present invention, the emulsion resin composition for electrodeposition paint as obtained above can be added and formed to the cationic electrodeposition paint composition, either with a very small amount of MIBK and xylene which are formulated for reducing viscosity and for enhancing handleability, or without them. Accordingly, the present invention has advantages that an amount of MIBK and xylene for diluting solution is made lowered and even eliminated and that the desolvation step of them is time-reduced or even eliminated. This makes an addition amount of MIBK and xylene significantly reduced and, in some case, even omits the addition of them. In the preparation method of the present invention, handleability of preparation is kept good to obtain stable emulsion, even if MIBK and xylene are added very small amount or are not added.

Electrodeposition Coating and Preparation of Cured Electrodeposited Coating Film An article to be electrocoated is dipped in the cationic electrodeposition paint composition thus obtained, and then electrodeposited to form an electrodeposited coating film. The electrodeposited coating film is then heated to cure to form a cured electrodeposited coating film.

The article to be electrocoated can be any article which is an electrocoatable substrate having electrical conductivity. The substrate includes, for example, a metal material (such as iron, steel, copper, aluminum, magnesium, tin, zinc and an alloy thereof), iron plate, steel plate, aluminum plate and a surface-treated plate thereof (such as chemical treatment using phosphate, zirconium salt and the like), as well as a molded article thereof.

The electrodeposition coating can be conducted by applying a voltage of 50 to 450 Volts between an article to be coated as cathode and an anode. Applied voltages of less than 50 volt do not provide sufficient electrodeposition coating. Those of more than 450 volt may destroy coated film and provide poor appearance. The electrodeposition coating may generally be conducted at a temperature of 10 to 45° C.

The electrodeposition coating method may comprise a step of dipping an article to be coated in an electrodeposition coating paint composition and a step of applying a voltage between an anode and a cathode of an article to be coated to deposit an uncured electrodeposited coating film. A time to apply voltage can be 2 to 4 minutes, although it is varied based on a condition of electrodeposition coating.

An electrodeposited coating film may preferably have a thickness of 5 to 25 μm. Thicknesses of less than 5 μm do not provide good corrosion resistance.

The article thus coated as mentioned above is then rinsed with water if necessary, and is cured at a temperature of 120 to 260° C. for 10 to 30 minutes to obtain a cured electrodeposited coating film.

EXAMPLES

The present invention will be explained more detail by the following examples which, however, are not construed to their details. In examples, "part" and "%" are generally based on mass, unless otherwise instructed.

Production Example 1

Production of Amine-Modified Epoxy Resin (Cationic Resin) (A)

A flask equipped with a stirrer, a condenser, a nitrogen gas inlet, a thermometer and a dropping funnel was prepared. Then, 440 parts by mass of an epoxy resin having an epoxy equivalent of 188, obtained by synthesizing from bisphenol A and epichlorohydrin (available from Dow Chemical Company as "DER331J"), 5 parts by mass of methanol, 75 parts by mass of an adduct of bisphenol A with 6 mole of ethylene oxide (available from Sanyo Chemical Industries, Co., Ltd. as BPE-60) and 0.01 parts by mass of dibutyltin dilaurate were added to the flask and 60 parts by mass of diphenylmethane diisocyanate was added dropwise thereto with stirring. Reaction started from room temperature and exothermed to 60° C. Reaction was continued for another 30 minutes and then reaction was continued at a temperature of 60 to 65° C. until an absorption of isocyanate group in IR spectrum disappeared.

Next, 1 part by mass of dimethylbenzylamine was added thereto to react at 130° C. until an epoxy equivalent reached to 263, while distilling by-produced methanol away by using a decanter. An infrared spectrometer showed an absorption of a carbonyl group of an oxazolidone ring at $1,750^{-1}$. Then, 135 parts by mass of bisphenol A and 50 parts by mass of 2-ethylhexane acid were added to the reaction vessel and reacted at 140° C. The reaction was continued until an epoxy equivalent reached to 1,118.

It was then cooled and, 40 parts by mass of N-methylethanolamine and 44 parts by mass of a ketimined product of aminoethylethanolamine (81% by mass in MIBK solution) were added and reacted at 160° C. for 2 hours to obtain an amine-modified epoxy resin (A) having a solid concentration of 99% by mass. The amine-modified epoxy resin (A) had a number average molecular weight of 1,800.

Production Example 2

Production of an Amine-Modified Epoxy Resin (Cationic Resin) (B)

A flask equipped with a stirrer, a condenser, a nitrogen gas inlet, a thermometer and a dropping funnel was prepared. Then, 440 parts by mass of an epoxy resin having an epoxy equivalent of 188, obtained by synthesizing from bisphenol A and epichlorohydrin (available from Dow Chemical Company as "DER331J"), 176 parts by mass of bisphenol A, 47 parts by mass of 2-ethylhexane acid and 1 part by mass of dimethylbenzylamine were added to the reaction flask and reacted at 140° C. until an epoxy equivalent reached to 1,420.

It was then cooled and, 28 parts by mass of N-methylethanolamine and 22 parts by mass of a ketimined product of aminoethylethanolamine (81% by mass in MIBK solution) were added and reacted at 160° C. for 2 hours to obtain an amine-modified epoxy resin (B) having a solid concentration of 99% by mass. The amine-modified epoxy resin (B) had a number average molecular weight of 1,800.

Production Example 3

Production of Blocked Isocyanate Curing Agent (b1-1)

A reaction vessel was charged with 1,350 parts by mass of crude MDI (available from Sumitomo Bayer Urethane Co., as Sumijule 44V20 having isocyanate content (NCO content) of 31%) and 277 parts by mass of MIBK, and heated to 80° C., into which 2.5 parts by mass of dibutyltin dilaurate was added. Into the vessel, a solution of 226 parts by mass of ε-caprolactam in 944 parts by mass of butyl cellosolve were dropwise added for 2 hours at 80° C. and then kept at 100° C. for 4 hours, after which IR spectrum showed that an absorption of isocyanate group disappeared. A blocked isocyanate curing agent (b1-1) having a solid concentration of 90% by mass was obtained as mentioned above. The blocked isocyanate curing agent (b1-1) had a dissociation temperature of 255° C.

Production Example 4

Production of Blocked Isocyanate Curing Agent (b2-1)

A reaction vessel was charged with 222 parts by mass of hexamethylene diisocyanate and 70 parts by mass of MIBK, and heated to 50° C., into which 0.2 parts by mass of dibutyltin laurate was added. Into the vessel, 186 parts by mass of methyl ethyl ketoxime and 224 parts by mass of trimethylolpropane were added dropwise for 2 hours at 50° C. in dried nitrogen blanket with stirring. Reaction temperature was kept at 80° C. with optional cooling, and continued until IR spectrum showed that an absorption of isocyanate group disappeared. After cooling it, a blocked isocyanate curing agent (b2-1) having a solid concentration of 90% by mass was obtained. The blocked isocyanate curing agent (b2-1) had a dissociation temperature of 200° C.

Production Example 5

Production of Blocked Isocyanate Curing Agent (b1-2)

A reaction vessel was charged with 1,350 parts by mass of crude MDI and heated to 120° C., into which 2.5 parts by mass of dibutyltin dilaurate was added. Into the vessel, a solution of 226 parts by mass of ε-caprolactam in 944 parts by mass of butyl cellosolve was dropwise added for 2 hours at 120° C. and then kept at 120° C. for 4 hours, after which IR spectrum showed that an absorption of isocyanate group disappeared. A blocked isocyanate curing agent (b1-2) having a solid concentration of 99% by mass was obtained as mentioned above. The blocked isocyanate curing agent (b1-2) had a dissociation temperature of 255° C.

Production Example 6

Production of Blocked Isocyanate Curing Agent (b2-2)

A reaction vessel was charged with 222 parts by mass of hexamethylene diisocyanate, and heated to 120° C., into which 0.2 parts by mass of dibutyltin laurate was added. Into the vessel, 186 parts by mass of methyl ethyl ketoxime and 224 parts by mass of trimethylolpropane were added dropwise for 2 hours at 120° C. in dried nitrogen blanket with stirring. Reaction temperature was kept at 120° C. with optional cooling, and continued until IR spectrum showed that an absorption of isocyanate group disappeared. After cooling it, a blocked isocyanate curing agent (b2-2) having a solid concentration of 99% by mass was obtained. The blocked isocyanate curing agent (b2-2) had a dissociation temperature of 200° C.

Production Example 7

Production of Pigment Dispersing Resin

A reaction vessel equipped with a stirrer, a condenser, a nitrogen gas inlet and a thermometer was charged with 222.0 parts by mass of isophorone diisocyanate (hereinafter mentioned as "IPDI"), and was then diluted with 39.1 parts by mass of MIBK, into which 0.2 parts by mass of dibutyltin dilaurate was added. After heating to 50° C., 131.5 parts by mass of 2-ethylhexanol was added dropwise for 2 hours with stirring in a dried nitrogen blanket. A reaction temperature was kept at 50° C. with optional cooling. Then, IPDI which was half-blocked with 2-ethylhexanol (solid content 90.0% by mass) was obtained.

Another reaction vessel was charged with 87.2 parts by mass of dimethylethanolamine, 117.6 parts by mass of 75% lactic acid aqueous solution and 39.2 parts by mass of ethyleneglycol mono-n-butyl ether in order and mixed at a temperature of 65° C. for about 30 minutes to obtain a quarternarizing agent.

Next, another reaction vessel was charged with 710.0 parts by mass of EPON 829 (a bisphenol type epoxy resin having an epoxy equivalent of 193 to 203, available from Shell Chemical Co., Ltd.) and 289.6 parts by mass of bisphenol A and heated to 150 to 160° C. in a nitrogen blanket, thus exothermic reaction occurring. The reaction was continued at 150 to 160° C. for about one hour and then cooled to 120° C., into which 498.8 parts by mass of the above prepared 2-ethylhexanol half-blocked IPDI as MIBK solution was added.

The reaction mixture was kept at 110 to 120° C. for about one hour and then 463.4 parts by mass of ethyleneglycol mono-n-butyl ether was added thereto. The mixture was cooled to 85 to 95° C. and homogenized, to which 196.7 parts by mass of the above obtained quarternarizing agent was added. The reaction mixture was kept at 85 to 95° C. until it showed an acid value of 1, and thereafter 964 parts by mass of deionized water was added to form a pigment dispersing resin having a quaternary ammonium salt (solid content of 50% by mass).

Production Example 8

Production of Pigment Dispersing Paste

A sand grinding mill was charged with 120 parts by mass of the pigment dispersing resin obtained in Production Example 7, 2.0 parts by mass of carbon black, 100.0 parts by mass of kaolin, 80.0 parts by mass of titanium dioxide, 18.0 parts by mass of aluminum phosphomolybdate and 221.7 parts by mass of ion-exchanged water, and dispersed until a particle size of 10 µm or less was obtained, to obtain a pigment dispersing paste (solid content of 48% by mass).

Comparative Production Example 1

Production of Amine-Modified Epoxy Resin (C)

A flask equipped with a stirrer, a condenser, a nitrogen gas inlet, a thermometer and a dropping funnel was prepared. Then, 440 parts by mass of an epoxy resin having an epoxy equivalent of 188, obtained by synthesizing from bisphenol A and epichlorohydrin (available from Dow Chemical Company as "DER331J"), 59 parts by mass of MIBK, 5 parts of mass of methanol, 75 parts by mass of an adduct of bisphenol A with 6 mole of ethylene oxide (available from Sanyo Chemical Industries, Co., Ltd. as BPE-60) and 0.01 parts by mass of dibutyltin dilaurate were added to the flask and 60 parts by mass of diphenylmethane diisocyanate was added thereto with stirring. Reaction started from room temperature and was exothermed to 60° C. Reaction was continued for another 30 minutes and then reaction was continued at a temperature of 60 to 65° C. until an absorption of isocyanate group in IR spectrum disappeared.

Next, 1 part by mass of dimethylbenzylamine was added thereto to react at 130° C. until an epoxy equivalent reached to 263, while distilling by-produced methanol away by using a decanter. An infrared spectrometer showed an absorption of a carbonyl group of an oxazolidone ring at $1,750^{-1}$. Then, 135 parts by mass of bisphenol A and 50 parts by mass of 2-ethylhexane acid were added to the reaction vessel and reacted at 120° C. The reaction was continued until an epoxy equivalent reached to 1,118.

Thereafter, 100 parts by mass of MIBK, 40 parts by mass of N-methylethanolamine and 44 parts by mass of a ketimined product of aminoethylethanolamine (81% by mass in MIBK solution) were added thereto and reacted at 110° C. for 2 hours to obtain an amine-modified epoxy resin (C) having a solid content of 83% by mass. The amine-modified epoxy resin (C) had a number average molecular weight of 1,900.

Example 1

Preparation of Emulsion Resin Composition for Cationic Electrodeposition Paint

The amine-modified epoxy resin (A) obtained in Production Example 1 was temperature-controlled so as to obtain a viscosity of 6,000 mPa·s and a temperature was 150° C. It was then kept for 30 minutes and a viscosity of 6,000 mPa·s was not changed. Another vessel was charged with 602 parts by mass of ion-exchanged water and a certain amount of glacial acetic acid, the amount corresponding to that a milli-gram equivalent of acid per 100 parts by mass of solid content of the amine-modified epoxy resin was 35, into which 900 parts by mass of the amine-modified epoxy resin (A) was added with stirring to obtain a W/O emulsion. The blocked isocyanate curing agent (b2-1) obtained in Production Example 4 was added in an amount complying with 70/30 (parts by mass of solid content) of a solid content ratio by mass of amine-modified epoxy resin/curing agent, and mixed until the mixture became uniform, to obtain a curing agent-containing W/O emulsion. The resulting curing agent-containing emulsion had a solid concentration $X_{W/O}$ of 65% by mass, at which a temperature of emulsion was controlled to 80° C. A total amount of MIBK and xylene was 6% by mass, based on 100 parts by mass of total resin content of amine-modified epoxy resin (A) and blocked isocyanate curing agent (b2-1).

To the obtained curing agent-containing W/O emulsion, ion-exchanged water was added slowly to dilute, so that phase inversion from W/O emulsion to O/W emulsion occurred at 47% ($X_{tra}$=47%) of solid concentration by mass (phase inversion point). Thereafter, ion-exchanged water was further added thereto slowly to dilute until a solid content by mass reached to 36% by mass. It was then subjected to a desolvation step in which MIBK was removed at a reduced pressure. It was diluted by ion-exchanged water to obtain an emulsion resin composition for cationic electrodeposition paint having 36% by mass of solid concentration. It took 45 minutes to remove MIBK. The resulting emulsion had a particle size of 80 nm.

In Example 1, the phase inversion point from W/O emulsion to O/W emulsion was determined by measuring a viscosity of emulsion. A viscosity of emulsion was continuously measured every 1.0% when diluting the curing agent-containing W/O emulsion with ion-exchanged water. Then, a change ratio was determined from the values of viscosity of emulsion and a point to become 300 mPa·s/% was made a phase inversion point. The viscosity was determined at 25° C. at 10 rpm, using a B type viscometer.

Figure 2:
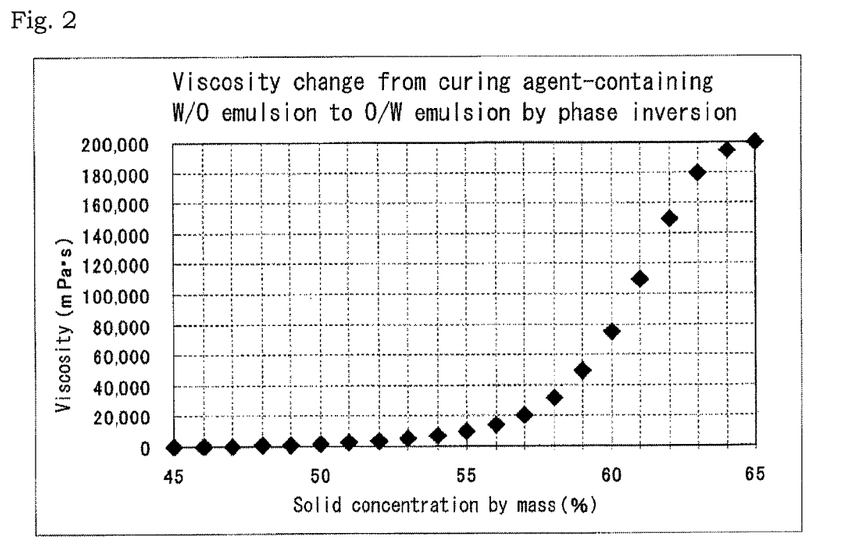
FIG. 2 is a graph which shows change of viscosity based on solid concentration by mass, when preparing an emulsion resin composition for a cationic electrodeposition paint.

FIGS. 2 and 3 are graphs which show viscosity and its change ratio in preparation of emulsion resin composition for cationic electrodeposition paint. When the curing agent-containing W/O emulsion was diluted with water, a viscosity increased firstly but then suddenly decreased together with increase of solid content by mass from a certain point, and a change of viscosity became small. When a change ratio of viscosity reached 47% by mass of solid concentration, a viscosity reached 300 mPa·s/%, which was made to be phase inversion point.

A particle size of the resulting emulsion was determined by calculating a median particle size in term of volume conversion, employing Microtrack UPA-150 (particle size distribution determination by light scattering, available from Nikkisou Co., Ltd.).

Preparation of Cationic Electrodeposition Paint Composition and Cured Electrodeposited Coating Film A cationic electrodeposition paint composition was obtained by mixing 375 parts by mass of the emulsion resin composition, obtained above, for electrodeposition paint, 135 parts by mass of the pigment dispersing paste obtained in Production Example 8 and 490 parts by mass of ion-exchanged water. The cationic electrodeposition paint composition had a solid content of 20% by mass.

A zinc phosphate treated steel panel (a steel panel (JIS G 3134 SPCC) treated with Surfdine SD-5000 available from Nippon Paint Co., Ltd.) was dipped as a cathode in the cationic electrodeposition paint composition and electrocoated at a bath temperature of 28° C. and at an applied voltage of 200 V for 180 seconds. The resulting coated panel was rinsed with water and cured at 160° C. for 25 minutes, followed by cooling it by air, to obtain a cured electrodeposited coating film having a thickness of 15 µm on the steel panel.

Example 2

Example 1 was generally conducted to form a curing agent-containing W/O emulsion, with the exception that an amount of ion exchanged water using in the preparation of W/O emulsion was changed to 955 parts by mass. The resulting curing agent-containing W/O emulsion had a solid content ($W_{W/O}$) of 55% by mass. A total amount of MIBK and xylene was 6% by mass, based on 100 parts by mass of a resin solid content of amine-modified epoxy resin (A) and blocked isocyanate curing agent (b2-1).

To the obtained curing agent-containing W/O emulsion, ion-exchanged water was added slowly and a phase inversion from W/O emulsion to O/W emulsion occurred at a solid content of 45% by mass ($X_{tra}$=45%). Ion-exchanged water was further added slowly thereto to dilute it to a solid content of 36% by mass. Next, MIBK was removed at a reduced pressure and a solid concentration was adjusted by ion-exchanged water to obtain an emulsion resin composition for electrodeposition paint having a solid concentration of 36% by mass. It took for 45 minutes to remove MIBK. The resulting emulsion had a particle size of 78 nm.

By using the resulting emulsion resin composition for cationic electrodeposition paint, a cationic electrodeposition coating composition and a cured electrodeposited coating film were obtained as generally described in Example 1.

Example 3

Example 1 was generally conducted to form a curing agent-containing W/O emulsion, with the exception that an amount of ion exchanged water using in the preparation of W/O emulsion was changed to 1,184 parts by mass. The resulting curing agent-containing W/O emulsion had a solid concentration ($W_{W/O}$) of 50% by mass. A total amount of MIBK and xylene was 6% by mass, based on 100 parts by mass of a resin solid content of amine-modified epoxy resin (A) and blocked isocyanate curing agent (b2-1).

To the obtained curing agent-containing W/O emulsion, ion-exchanged water was added slowly and a phase inversion from W/O emulsion to O/W emulsion occurred at a solid concentration of 46% by mass ($X_{tra}$=46%). Ion-exchanged water was further added slowly thereto to dilute it to a solid content of 36% by mass. Next, MIBK was removed at a reduced pressure and a solid concentration was adjusted by ion-exchanged water to obtain an emulsion resin composition for electrodeposition paint having a solid concentration of 36% by mass. It took for 45 minutes to remove MIBK. The resulting emulsion had a particle size of 95 nm.

By using the resulting emulsion resin composition for cationic electrodeposition paint, a cationic electrodeposition coating composition and a cured electrodeposited coating film were obtained as generally described in Example 1.

Example 4

Example 1 was generally conducted to form a curing agent-containing W/O emulsion, with the exception that the amine-modified epoxy resin (B) obtained in Production Example 2 was employed instead of the amine modified epoxy resin (A) obtained in Production Example 1. The resulting curing agent-containing W/O emulsion had a solid concentration ($W_{W/O}$) of 65% by mass. A total amount of MIBK and xylene was 6% by mass, based on 100 parts by mass of the resin solid content of amine-modified epoxy resin (B) and blocked isocyanate curing agent (b2-1).

To the obtained curing agent-containing W/O emulsion, ion-exchanged water was added slowly and a phase inversion from W/O emulsion to O/W emulsion occurred at a solid concentration of 47% by mass ($X_{tra}$=47%). Ion-exchanged water was further added slowly thereto to dilute it to a solid content of 36% by mass. Next, MIBK was removed at a reduced pressure and a solid concentration was adjusted by ion-exchanged water to obtain an emulsion resin composition for electrodeposition paint having a solid concentration of 36% by mass. It took for 45 minutes to remove MIBK. The resulting emulsion had a particle size of 77 nm.

By using the resulting emulsion resin composition for cationic electrodeposition paint, a cationic electrodeposition coating composition and a cured electrodeposited coating film were obtained as generally described in Example 1.

Example 5

Example 1 was generally conducted to form a curing agent-containing W/O emulsion, with the exception that the blocked isocyanate curing agent (b1-1) obtained in Production Example 3 was employed, instead of the blocked isocyanate curing agent (b2-1) obtained in Production Example 4, and that an amount of ion-exchanged water in preparation of W/O emulsion was changed to 517 parts by mass. The resulting curing agent-containing W/O emulsion had a solid concentration ($W_{W/O}$) of 68% by mass. A total amount of MIBK and xylene was 6% by mass, based on 100 parts by mass of the resin solid content of amine-modified epoxy resin (A) and blocked isocyanate curing agent (b1-1).

To the obtained curing agent-containing W/O emulsion, ion-exchanged water was added slowly and a phase inversion from W/O emulsion to O/W emulsion occurred at a solid concentration of 48% by mass ($X_{tra}$=48%). Ion-exchanged water was further added slowly thereto to dilute it to a solid content of 36% by mass. Next, MIBK was removed at a reduced pressure and a solid concentration was adjusted by ion-exchanged water to obtain an emulsion resin composition for electrodeposition paint having a solid concentration of 36% by mass. It took for 45 minutes to remove MIBK. The resulting emulsion had a particle size of 84 nm.

By using the resulting emulsion resin composition for cationic electrodeposition paint, a cationic electrodeposition coating composition and a cured electrodeposited coating film were obtained as generally described in Example 1.

Example 6

The blocked isocyanate curing agent (b1-2) obtained in Production Example 5 was added to the amine-modified epoxy resin (B) obtained in Production Example 2 in a solid content ratio by mass of 70/15 (epoxy resin/curing agent) and mixed until it became uniform, to obtain a blocked isocyanate-containing cationic resin. Its viscosity was adjusted by heating to 6,000 mPa·s at which temperature was 140° C. It was kept for 30 minutes, but the viscosity of 6,000 mPa·s was not changed. Another reaction vessel was charged with 602 parts by mass of ion-exchanged water and a glacial acetic acid in such an amount that a milli-gram equivalent of acid per 100 parts by mass of a solid content of an amine modified epoxy resin was 35. To the reaction vessel, 900 parts by mass of the blocked isocyanate-containing cationic resin which was composed of the amine-modified epoxy resin (B) and the blocked isocyanate curing agent (b1-2) and which was kept 140° C. was added with stirring, to obtain a W/O emulsion. The blocked isocyanate curing agent (b2-1) obtained in Production Example 4 was added to the W/O emulsion in such an amount that a solid content ratio by mass of amine-modified epoxy resin/curing agent of 70/15, and mixed until it became uniform, to obtain a curing agent-containing W/O emulsion. The resulting curing agent-containing W/O emulsion had a solid concentration ($X_{W/O}$) of 65% by mass. The curing agent-containing W/O emulsion was controlled to be 80° C. A total amount of MIBK and xylene was 4% by mass, based on 100 parts by mass of the resin solid content of amine-modified epoxy resin (B) and blocked isocyanate curing agent (b1-2) and (b2-1). It should be noted that a solid content ratio by mass of amine-modified epoxy resin/curing agent was 70/30 by mass.

To the obtained curing agent-containing W/O emulsion, ion-exchanged water was added slowly and a phase inversion from W/O emulsion to O/W emulsion occurred at a solid concentration of 49% by mass ($X_{tra}$=49%). Ion-exchanged water was further added slowly thereto to dilute it to a solid concentration of 36% by mass. Next, MIBK was removed at a reduced pressure and a solid concentration was adjusted by ion-exchanged water to obtain an emulsion resin composition for electrodeposition paint having a solid concentration of 36% by mass. It took for 10 minutes to remove MIBK. The resulting emulsion had a particle size of 80 nm.

By using the resulting emulsion resin composition for cationic electrodeposition paint, a cationic electrodeposition coating composition and a cured electrodeposited coating film were obtained as generally described in Example 1.

Example 7

A viscosity of the amine-modified epoxy resin (B) obtained in Production Example 2 was controlled by heating to 6,000 mPa·s, at which temperature was 150° C. It was kept for 30 minutes, but the viscosity of 6,000 mPa·s was not changed. Another reaction vessel was charged with 602 parts by mass of ion-exchanged water and glacial acetic acid in such an amount that a milli-gram equivalent of acid per 100 parts by mass of a solid content of an amine modified epoxy resin was 35. To the reaction vessel, 900 parts by mass of the amine-modified epoxy resin (B) was added with stirring, to obtain a W/O emulsion. The amine-modified epoxy resin (B), the blocked isocyanate curing agent (b1-2) obtained in Production Example 5 and the blocked isocyanate curing agent (b2-2) obtained in Production Example 6 were added to the W/O emulsion in such an amount that a solid content ratio by mass of amine-modified epoxy resin/curing agent (b1-2)/ curing agent (b2-2) was 70/15/15, and mixed until it became uniform, to obtain a curing agent-containing W/O emulsion. The resulting curing agent-containing W/O emulsion had a solid concentration ($X_{W/O}$) of 65% by mass. The curing agent-containing W/O emulsion was controlled to be 80° C. A total amount of MIBK and xylene was 3% by mass, based on 100 parts by mass of the resin solid content of the amine-modified epoxy resin (B) and the blocked isocyanate curing agents (b1-2) and (b2-2).

To the obtained curing agent-containing W/O emulsion, ion-exchanged water was added slowly and a phase inversion from W/O emulsion to O/W emulsion occurred at a solid concentration of 50% by mass ($X_{tra}$=50%). Ion-exchanged water was further added slowly thereto to dilute it to a solid content of 36% by mass. Removal of MIBK was not conducted because the total amount of MIBK and xylene was as small as 3 parts by mass. The resulting emulsion had a particle size of 83 nm.

By using the resulting emulsion resin composition for cationic electrodeposition paint, a cationic electrodeposition coating composition and a cured electrodeposited coating film were obtained as generally described in Example 1.

Comparative Example 1

The blocked isocyanate curing agent (b2-1) obtained in Production Example 4 was added to the amine-modified epoxy resin (C) obtained in Comparative Production Example 1 in such an amount that a solid content ratio of amine-modified epoxy resin/curing agent was 70/30, and mixed until it became uniform. It was adjusted by heating to 6,000 mPa·s, at which temperature was 80° C. It had a solid concentration of 85% by mass and it was kept at 80° C., but the viscosity of 6,000 mPa·s was not changed. The mixture was in the form of resin solution. A total amount of MIBK and xylene was 19% by mass, based on 100 parts by mass of a resin solid content of the amine-modified epoxy resin (C) and the blocked isocyanate curing agent (b2-1).

It was then poured in another reaction vessel and glacial acetic acid was added thereto in such an amount that a milli-gram equivalent of acid per 100 parts by mass of a solid content of an amine modified epoxy resin was 35. To the reaction vessel, ion-exchanged water was added slowly to dilute and a phase inversion from W/O emulsion to O/W emulsion occurred at a solid concentration of 42% by mass. Ion-exchanged water was further added slowly thereto to dilute it to a solid content of 36% by mass. Next, MIBK was removed at a reduced pressure and a solid concentration was adjusted by ion-exchanged water to obtain an emulsion resin composition for electrodeposition paint having a solid concentration of 36% by mass. It took for 140 minutes to remove MIBK. The resulting emulsion had a particle size of 81 nm.

By using the resulting emulsion resin composition for cationic electrodeposition paint, a cationic electrodeposition coating composition and a cured electrodeposited coating film were obtained as generally described in Example 1.

Comparative Example 2

The blocked isocyanate curing agent (b2-1) obtained in Production Example 4 was added to the amine-modified epoxy resin (A) obtained in Production Example 1 in such an amount that a solid content ratio by mass of amine-modified epoxy resin/curing agent was 70/30, and mixed until it became uniform. At this point, it had a viscosity of 12,000 mPa·s at 80° C. and had a solid concentration of 96% by mass. It was kept at 80° C. for 30 minutes, but the viscosity of 12,000 mPa·s was not changed. The mixture was in the form of resin solution. A total amount of MIBK and xylene was 6% by mass, based on 100 parts by mass of a resin solid content of the amine-modified epoxy resin (A) and the blocked isocyanate curing agent (b2-1).

It was then poured in another reaction vessel and glacial acetic acid was added thereto in such an amount that a milli-gram equivalent of acid per 100 parts by mass of a solid content of an amine modified epoxy resin was 35. To the reaction vessel, ion-exchanged water was added slowly to dilute, but stirring was not uniformly conducted because of high viscosity. At this point, a phase inversion from W/O emulsion to O/W emulsion did not clearly occur. Ion-exchanged water was further added slowly thereto to dilute it to a solid content of 36% by mass. Next, MIBK was removed at a reduced pressure and a solid concentration was adjusted by ion-exchanged water to obtain an emulsion resin composition for electrodeposition paint having a solid concentration of 36% by mass. It took for 45 minutes to remove MIBK. The resulting emulsion had a particle size of 260 nm.

By using the resulting emulsion resin composition for cationic electrodeposition paint, a cationic electrodeposition coating composition and a cured electrodeposited coating film were obtained as generally described in Example 1.

Comparative Example 3

The blocked isocyanate curing agent (b2-1) obtained in Production Example 4 was added to the amine-modified epoxy resin (A) obtained in Production Example 1 in such an amount that a solid content ratio of amine-modified epoxy resin/curing agent was 70/30, and mixed until it became uniform. It was adjusted by heating to 6,000 mPa·s, at which temperature was 120° C. It had a solid concentration of 95% by mass and it was kept at 120° C. for 30 minutes, and a viscosity was elevated to 13,000 mPa·s. At this point, the mixture was a resin solution and a total amount of MIBK and xylene was 6% by mass, based on 100 parts by mass of a resin solid content of the amine-modified epoxy resin (A) and the blocked isocyanate curing agent (b2-1).

It was then poured in another reaction vessel and glacial acetic acid was added thereto in such an amount that a milli-gram equivalent of acid per 100 parts by mass of a solid content of an amine modified epoxy resin was 35. To the reaction vessel, ion-exchanged water was added slowly to dilute and a phase inversion from W/O emulsion to O/W emulsion occurred at a solid concentration of 45% by mass. Ion-exchanged water was further added slowly thereto to dilute it to a solid concentration of 36% by mass. Next, MIBK was removed at a reduced pressure and a solid concentration was adjusted by ion-exchanged water to obtain an emulsion resin composition for electrodeposition paint having a solid concentration of 36% by mass. It took for 30 minutes to remove MIBK. The resulting emulsion had a particle size of 82 nm.

By using the resulting emulsion resin composition for cationic electrodeposition paint, a cationic electrodeposition coating composition and a cured electrodeposited coating film were obtained as generally described in Example 1.

Comparative Example 4

Example 1 was generally conducted to form a curing agent-containing W/O emulsion, with the exception that an amount of ion-exchanged water in preparation of W/O emulsion was changed to 1,289 parts by mass. The resulting curing agent-containing W/O emulsion had a solid concentration ($W_{W/O}$) of 48% by mass. A total amount of MIBK and xylene was 6% by mass, based on 100 parts by mass of the resin solid content of the amine-modified epoxy resin (A) and the blocked isocyanate curing agent (b2-1).

To the obtained curing agent-containing W/O emulsion, ion-exchanged water was added slowly and a phase inversion from W/O emulsion to O/W emulsion occurred at a solid concentration of 45% by mass ($X_{tra}$=45%). Ion-exchanged water was further added slowly thereto to dilute it to a solid content of 36% by mass. Next, MIBK was removed at a reduced pressure and a solid concentration was adjusted by ion-exchanged water to obtain an emulsion resin composition for electrodeposition paint having a solid concentration of 36% by mass. It took for 45 minutes to remove MIBK. The resulting emulsion had a particle size of 170 nm.

By using the resulting emulsion resin composition for cationic electrodeposition paint, a cationic electrodeposition coating composition and a cured electrodeposited coating film were obtained as generally described in Example 1.

Comparative Example 5

The amine-modified epoxy resin (A) obtained in Production Example 1 was adjusted by heating to be a viscosity of 6,000 mPa·s, at which a temperature was 150° C. It was kept at 150° C. for 30 minutes, and a viscosity of 6,000 mPa·s was not changed. Another reaction vessel was charged with 1,814 parts by mass of ion-exchanged water and glacial acetic acid in such an amount that a milli-gram equivalent of acid per 100 parts by mass of a solid content of an amine modified epoxy resin was 35. To the reaction vessel, the amine-modified epoxy resin (A) was added with stirring, to find that the emulsion was already changed to O/W emulsion.

To the resulting O/W emulsion, the blocked isocyanate curing agent (b2-1) obtained in Production Example 4 was added in such an amount that a solid content ratio of amine-modified epoxy resin/curing agent was 70/30. At this point, a total amount of MIBK and xylene was 6% by mass, based on 100 parts by mass of a resin solid content of the amine-modified epoxy resin (A) and the blocked isocyanate curing agent (b2-1). The obtained emulsion was already in the form of O/W emulsion and the added blocked isocyanate curing agent was precipitated therein, which was not uniform O/W emulsion.

The resultant mixture was an ununiform O/W emulsion in which the blocked isocyanate curing agent was precipitated. It could not form cationic electrodeposition paint composition, accordingly.

Comparative Example 6

The blocked isocyanate curing agent (b2-2) obtained in Production Example 6 was mixed uniformly with the amine-modified epoxy resin (B) obtained in Production Example 2, in such an amount that a solid content ratio by mass of epoxy resin (B)/curing agent (b2-2) was 70/15, and then adjusted by heating to be a viscosity of 3,000 mPa·s, at which a temperature was 140° C. It had a solid concentration of 99% by mass. It was kept at 140° C. for 30 minutes, at which a viscosity increased to a range which could not be measured, as being semi-solid and which could not be dispersed. Accordingly, a cationic electrodeposition paint composition could not be prepared. The blocked isocyanate curing agent (b1-2), which was preliminary prepared to be mixed with the emulsion, was not employed.

Comparative Example 7

The blocked isocyanate curing agent (b1-2) obtained in Production Example 5 and the blocked isocyanate curing agent (b2-2) obtained in Production Example 6 were added to the amine-modified epoxy resin (B) obtained in Production Example 2, in such an amount that a solid content ratio by mass was 70/15/15 (epoxy resin (B)/curing agent (b1-2)/curing agent (b2-2)), and then adjusted by heating to be a viscosity of 6,000 mPa·s, at which a temperature was 130° C. It had a solid concentration of 99% by mass. It was kept at 130° C. for 30 minutes, at which a viscosity increased to 55,000 mPa·s. Another reaction vessel was charged with 602 parts by mass of ion-exchanged water and glacial acetic acid in such an amount that a milli-gram equivalent of acid per 100 parts by mass of a solid content of an amine modified epoxy resin was 35. To the reaction vessel, the amine-modified epoxy resin (B) was added with stirring, to obtain a W/O emulsion. The resulting curing agent-containing WO emulsion had a solid concentration ($X_{W/O}$) of 65% by mass. At this point, the curing agent-containing W/O emulsion had a temperature of 80° C. A total amount of MIBK and xylene was 3% by mass, based on 100 parts by mass of the resin solid content of the amine-modified epoxy resin (B) and the blocked isocyanate curing agents (b1-2) and (b2-2).

To the resulting O/W emulsion, ion-exchanged water was added slowly and a phase inversion from W/O emulsion to O/W emulsion occurred at a solid concentration of 46% by mass ($X_{tra}$=46%). Ion-exchanged water was further added slowly thereto to dilute it to a solid concentration of 36% by mass. Removal of MIBK and xylene was not conducted because the total amount of MIBK and xylene was 3 parts by mass. The resulting emulsion had a particle size of 700 nm.

By using the resulting emulsion resin composition for cationic electrodeposition paint, a cationic electrodeposition coating composition and a cured electrodeposited coating film were obtained as generally described in Example 1.

Emulsions (emulsion resin composition for cationic electrodeposition paint) and cured electrodeposited coating films obtained in Examples and Comparative Examples were evaluated as described hereinafter, and the revaluated results are shown in Tables 1 and 2.

Time for Removing MIBK in Desolvation Step

The emulsion resin compositions for cationic electrodeposition paint obtained in Examples and Comparative Examples were put in a pressure resistant vessel. A pressure was reduced and time was measured until it had 3 parts by mass of the content of MIBK based on 100 parts by mass of a total amount of a solid content of cationic resin and blocked isocyanate curing agent.

Storage Stability of Emulsion Resin Composition for Cationic Electrodeposition Paint Emulsion resin composition for cationic electrodeposition paint was kept 12 weeks at a temperature of 40° C. and it was determined by eyes whether precipitation was present or not. Time to find precipitation was evaluated as following:

1 . . . Precipitation was found immediately after preparing emulsion.

2 . . . Precipitation was found next day after preparing emulsion.

3 . . . Precipitation was found 4 weeks later after preparing emulsion.

4 . . . Precipitation was found 12 weeks later after preparing emulsion.

5 . . . Precipitation was not found even after 12 weeks from preparing emulsion.

Surface Smoothness of Coated Panel

An evaluation of an appearance of a coated electrodeposited coating film prepared in Examples and Comparative Examples was determined by an arithmetic mean roughness (Ra, cut-off value of 0.8 μm) of roughness curve using a surface roughness tester available from Mitutoyo Co., Ltd. as SURFTEST SJ-201P. Evaluation criteria were as follow. The smaller the Ra values, the better the appearance and the less the roughness. The values of not less than 4 were determined as acceptance.

1 . . . 0.30 or more

2 . . . 0.25 or more and less than 0.30

3 . . . 0.20 or more and less than 0.25

4 . . . less than 0.20

TABLE 1

|  |  | Examples ||||||| 
|  |  | 1 | 2 | 3 | 4 | 5 | 6 | 7 |
| --- | --- | --- | --- | --- | --- | --- | --- | --- |
|  | Cationic resin | A | A | A | B | A | B | B |
|  | Blocked isocyanate curing agent | b2-1 | b2-1 | b2-1 | b2-1 | b1-1 | b1-2 b2-1 | b1-2 b2-2 |
| W/O Emulsion Preparation Step (1) | Blocked isocyanate curing agent to be mixed with cationic resin | None | None | None | None | None | b1-2 | None |
|  | Solution temperature (° C.) when mixing cationic resin with blocked isocyanate curing agent | — | — | — | — | — | 140 | — |
|  | Appearance of W/O emulsion | W/O | W/O | W/O | W/O | W/O | W/O | W/O |
| Curing agent-containing W/O Emulsion Preparation Step (2) | Blocked isocyante curing agent to be mixed with W/O emulsion | b2-1 | b2-1 | b2-1 | b2-1 | b1-1 | b2-1 | b1-1 b2-2 |
|  | Solution temperature (° C.) when mixing W/O emulsion with blocked isocyanate curing agent | 80 | 80 | 80 | 80 | 80 | 80 | 80 |
|  | Solid concentration by mass $X_{W/O}$ (%) of curing agent-containing W/O emulsion | 65 | 55 | 50 | 65 | 68 | 65 | 65 |
|  | Total content (%) of MIBK and xylene, based on total resin solid content of cationic resin and blocked isocyanate curing agent | 6 | 6 | 6 | 6 | 6 | 4 | 3 |
| O/W Emulsion Preparation Step (3) | Solid concentration by mass $X_{tra}$ (%) at phase inversion point | 47 | 45 | 46 | 47 | 48 | 49 | 50 |
|  | $X_{W/O}$-$X_{tra}$ (%) | 18 | 10 | 4 | 18 | 20 | 16 | 15 |
|  | Particle size (nm) of O/W emulsion | 80 | 78 | 95 | 77 | 84 | 80 | 83 |
| Evaluations | Time (minute) for removing MIBK in desolvation step | 45 | 45 | 45 | 45 | 45 | 10 | 0 |
|  | Storage stability of emulsion resin composition | 5 | 4 | 3 | 5 | 5 | 4 | 4 |
|  | Surface smoothness of coated panel | 4 | 4 | 4 | 4 | 4 | 4 | 4 |

TABLE 2

|  | Examples |||||||
|  | C 1 | C 2 | C 3 | C 4 | C 5 | C 6 | C 7 |
| --- | --- | --- | --- | --- | --- | --- | --- |
| Cationic resin | C | A | A | A | A | B | B |
| Blocked isocyanate curing agent | b2-1 | b2-1 | b2-1 | b2-1 | b2-1 | b1-2 b2-2 | b1-2 b2-2 |

TABLE 2-continued

| | | Examples | | | | | | |
|---|---|---|---|---|---|---|---|---|
| | | C 1 | C 2 | C 3 | C 4 | C 5 | C 6 | C 7 |
| W/O Emulsion Preparation Step (1) | Blocked isocyanate curing agent to be mixed with cationic resin | b2-1 | b2-1 | b2-1 | None | None | b2-2 | b1-2 b2-2 |
| | Solution temperature (° C.) when mixing cationic resin with blocked isocyanate curing agent | 80 | 80 | 120 | — | — | 140 | 130 |
| | Appearance of W/O emulsion | Soln. | Soln. | Soln. | W/O | O/W | — | — |
| Curing agent-containing W/O Emulsion Preparation Step (2) | Blocked isocyante curing agent to be mixed with W/O emulsion | None | None | None | b2-1 | b2-1 | — | — |
| | Solution temperature (° C.) when mixing W/O emulsion with blocked isocyanate curing agent | — | — | — | 80 | 80 | — | — |
| | Solid concentration by mass $X_{W/O}$ (%) of curing agent-containing W/O emulsion | — | — | — | 48 | — | — | 65 |
| | Total content (%) of MIBK and xylene, based on total resin solid content of cationic resin and blocked isocyanate curing agent | 19 | 6 | 6 | 6 | 6 | — | 3 |
| O/W Emulsion Preparation Step (3) | Solid concentration by mass $X_{tra}$ (%) at phase inversion point | 42 | — | 45 | 45 | — | — | 46 |
| | $X_{W/O}$–$X_{tra}$ (%) | — | — | — | 3 | — | — | 19 |
| | Particle size (nm) of O/W emulsion | 81 | 260 | 82 | 170 | ppt. | — | 700 |
| Evaluations | Time (minute) for removing MIBK in desolvation step | 140 | 45 | 30 | 45 | — | — | 0 |
| | Storage stability of emulsion resin composition | 4 | 1 | 4 | 2 | 1 | — | 2 |
| | Surface smoothness of coated panel | 4 | 4 | 1 | 4 | — | — | 1 |

As is shown in Table 1, the emulsion resin composition for cationic electrodeposition paint prepared by the method of the present invention is very economic because an addition of MIBK in preparation is not necessary or is very small, and it significantly reduces environmental load because desolvation step is very short or is not necessary. In addition, the emulsion resin of the present invention can keep an average particle size of not more than 100 nm and has excellent storage stability because an addition of MIBI in preparation is not necessary or is very small amount and uniform mixing is possible. The cationic electrodeposition paint obtained from the emulsion resin composition of the present invention can provide with cured coating films having excellent smoothness and good appearance.

Comparative Example 1 shows a conventional preparation of an emulsion resin composition for cationic electrodeposition paint. In Comparative Example 1, an amine-modified epoxy resin containing MIBK and xylene is mixed with a blocked isocyanate curing agent to form a uniform mixture, to which ion-exchanged water was added to phase-transfer to O/W emulsion. The emulsion resin obtained in this process had MIBK and xylene in a high amount of 19% by mass and it took very long time to remove those solvents by desolvation step. The conventional process of Comparative Example 1 is not economic and takes long time to remove solvents. The conventional process is heavy load on environment, accordingly.

Comparative Example 2 shows a conventional process for preparing an emulsion resin composition for cationic electrodeposition paint, using an amine-modified epoxy resin which contains substantially no amount of MIBK and xylene. In Comparative Example 2, since MIBK and xylene were contained in a very small amount, a viscosity of an emulsion was very high and it was very poor in uniform mixing or stirring ability. The resulting emulsion resin had a larger particle size and had poor storage stability.

Comparative Example 3 shows a conventional process for preparing an emulsion resin composition for cationic electrodeposition paint, using an amine-modified epoxy resin which contains substantially no amount of MIBK and xylene. In Comparative Example 3, preparation was conducted at a higher temperature of 120° C., in order to enhance handleability. However, in this process, temperature was kept higher when an amine-modified epoxy resin was mixed with a blocked isocyanate curing agent, and the high temperature dissociated the blocking agent from the blocked isocyanate curing agent to start reaction with the amine-modified epoxy resin in the emulsion resin. The unnecessary reaction deteriorates surface smoothness of the obtained coating film and provides poor appearance.

Comparative Example 4 shows that a solid content by mass $X_{W/O}$ (%) of the curing agent-containing W/O emulsion and a solid content by mass $X_{tra}$ (%) at the phase inversion point do not have a relation of $X_{W/O}$–$X_{tra}$>3%. In Comparative Example 4, the resulting emulsion had a particle size of 170 nm which was larger than Examples, and showed poor storage stability, although emulsion resin could be prepared.

Comparative Example 5 shows a preparation that an O/W emulsion of amine-modified epoxy resin is prepared and then a blocked isocyanate curing agent is mixed therewith. In Comparative Example 5, the blocked isocyanate curing agent was precipitated in the emulsion and did not provide with uniform O/W emulsion.

Comparative Example 6 shows that, in step (1), amine-modified epoxy resin is mixed at 140° C. with blocked isocyanate curing agent (b2-2) having a dissociation temperature of 200° C., followed by preparing W/O emulsion. In Comparative Example 6, the amine-modified epoxy resin was reacted with the curing agent in which blocking agent was dissociated, to start polymerization, thus forming semi-solid substance. Accordingly, the polymer was not dispersed in water and could not form cationic electrodeposition paint.

Comparative Example 7 shows that, in step (1), amine-modified epoxy resin is mixed at 130° C. with blocked isocyanate curing agent (b1-2) having a dissociation temperature of 255° C. and blocked isocyanate curing agent (b2-2) having a dissociation temperature of 200° C., followed by preparing W/O emulsion. In Comparative Example 7, the amine-modified epoxy resin was reacted with the curing agent in which blocking agent was dissociated, to start polymerization. The emulsion could be formed into a cationic electrodeposition paint, but the resulting cured coating film showed poor smoothness because of poor flowability.

INDUSTRIAL APPLICABILITY

The emulsion resin composition for cationic electrodeposition paint of the present invention can be employed as a binder resin of a primer coating composition for automobile bodies. In production factories of automobile bodies, the emulsion resin composition is usefully used as electrodeposition paint which is environmentally friendly.

The invention claimed is:

1. A method for preparing an emulsion resin composition for cationic electrodeposition paint, which comprises a cationic resin and a blocked isocyanate curing agent, the method comprises the steps:
   (1) a step of mixing water and the cationic resin to form a W/O emulsion,
   (2) a step of mixing the blocked isocyanate curing agent and the W/O emulsion to form a curing agent-containing W/O emulsion,
   (3) a step of mixing water and the curing agent-containing W/O emulsion to form an O/W emulsion, via a phase inversion point from W/O emulsion to O/W emulsion,
   wherein the cationic resin comprises a cationic epoxy resin, and
   a solid concentration by mass $X_{W/O}$ (%) of the curing agent-containing W/O emulsion and a solid concentration by mass $X_{tra}$ (%) at the phase inversion point from W/O emulsion to O/W emulsion satisfy a relation of $X_{W/O} - X_{tra} > 3\%$.

2. A method for preparing an emulsion resin composition for cationic electrodeposition paint according to claim 1, wherein the blocked isocyanate curing agent is composed of a block isocyanate curing agent (b1) having a dissociation temperature of not less than 230° C. and a block isocyanate curing agent (b2) having a dissociation temperature of less than 230° C., the step (1) consists of mixing water, the cationic resin and a portion or all of the block isocyanate curing agent (b1) to form a W/O emulsion, and the step (2) consists of mixing the obtained W/O emulsion, the block isocyanate curing agent (b2) and the balance of the block isocyanate curing agent (b1) if any to form a curing agent-containing W/O emulsion.

3. A method for preparing an emulsion resin composition for cationic electrodeposition paint according to claim 1, wherein the cationic epoxy resin has a number average molecular weight of 800 to 5,000.

4. A method for preparing an emulsion resin composition for cationic electrodeposition paint according to claim 1, wherein the curing agent-containing W/O emulsion obtained in the step (2) contains methyl isobutyl ketone and xylene in an amount of not more than 8% by mass, based on the total resin solid content of the cationic resin and the blocked isocyanate curing agent.

5. A method for preparing an emulsion resin composition for cationic electrodeposition paint according to claim 1, wherein $X_{W/O}$ and $X_{tra}$ meets the following inequality $$X_{W/O} - X_{tra} > 8\%.$$

6. A method for preparing an emulsion resin composition for cationic electrodeposition paint according to claim 1, wherein the curing agent-containing W/O emulsion obtained in the step (2) contains methyl isobutyl ketone and xylene in an amount of not more than 4% by mass, based on 100 parts by mass of the total resin solid content of the cationic resin and the blocked isocyanate curing agent.

7. A method for preparing an emulsion resin composition for cationic electrodeposition paint according to claim 6, which does not include a desolvation step.

* * * * *